(12) United States Patent
Mansir et al.

(10) Patent No.: US 12,051,953 B2
(45) Date of Patent: Jul. 30, 2024

(54) FORM WOUND MOTOR FOR ELECTRICAL SUBMERSIBLE PUMPS

(71) Applicant: CORETEQ SYSTEMS LTD, Surrey (GB)

(72) Inventors: Hassan Mansir, Berkshire (GB); Andras Bencze, Hampshire (GB)

(73) Assignee: CORETEQ SYSTEMS LTD, Surrey (GB)

( * ) Notice: Subject to any disclaimer, the term of this patent is extended or adjusted under 35 U.S.C. 154(b) by 255 days.

(21) Appl. No.: 17/695,148

(22) Filed: Mar. 15, 2022

(65) Prior Publication Data

US 2022/0311300 A1  Sep. 29, 2022

(30) Foreign Application Priority Data

Mar. 26, 2021 (GB) ..................... 2104354

(51) Int. Cl.
*H02K 3/487* (2006.01)
*H02K 1/16* (2006.01)
(Continued)

(52) U.S. Cl.
CPC ............. *H02K 3/487* (2013.01); *H02K 1/16* (2013.01); *H02K 3/12* (2013.01); *H02K 3/28* (2013.01); *E21B 43/128* (2013.01)

(58) Field of Classification Search
CPC .......... H02K 3/487; H02K 1/16; H02K 3/12; H02K 3/28; E21B 43/128
See application file for complete search history.

(56) References Cited

U.S. PATENT DOCUMENTS

| | | | | |
|---|---|---|---|---|
| 2010/0001609 A1* | 1/2010 | Ishigami | .................. | H02K 3/12 310/202 |
| 2015/0076953 A1* | 3/2015 | Tamura | .................... | H02K 3/28 310/208 |

FOREIGN PATENT DOCUMENTS

| | | | |
|---|---|---|---|
| DE | 102015225585 A1 | * | 6/2017 |
| DE | 102015225585 A1 | | 6/2017 |

(Continued)

OTHER PUBLICATIONS

WO-2020174179-A1_translate (Year: 2020).*

(Continued)

*Primary Examiner* — Tulsidas C Patel
*Assistant Examiner* — Mohammed Ahmed Qureshi
(74) *Attorney, Agent, or Firm* — Conley Rose, P.C.; Rodney B. Carroll

(57) ABSTRACT

Disclosed is an apparatus According to the present invention, a new winding arrangement was developed to enhance the manufacturability of stators with large length to diameter ratio and small aperture diameters such as the ones designed and manufactured for downhole pumping applications. The rectangular conductors are pre-formed to a specific shape, nested together, and inserted into the stator slots. Once the conductors are inserted, additional bending and joining operations are required to complete the coils and phases. These operations can be either fully automatic or semi-automatic. The structure of the winding allows insertion of phase and phase to phase insulation after the joining operation is completed thus reducing the risk of damage to the insulation system during the joining process. The preformed winding due to its ability to nest by design results is very short end-turns compared to conventional winding.

20 Claims, 19 Drawing Sheets

(51) Int. Cl.
*H02K 3/12* (2006.01)
*H02K 3/28* (2006.01)
*E21B 43/12* (2006.01)

(56) References Cited

FOREIGN PATENT DOCUMENTS

| FR | 3093386 A1 | 9/2020 | |
|---|---|---|---|
| JP | 2002153029 A | 5/2002 | |
| WO | WO-2020174179 A1 * | 9/2020 | ............... H02K 3/12 |

OTHER PUBLICATIONS

WO-2020174179-A1_translate (Year: 2017).*
Foreign Communication from Priority Application—Priority Document, Great Britain Application No. 2104354.2 filed Mar. 26, 2021, dated Jun. 2, 2022, 37 pages.
Foreign Communication from Related Application—International Search Report and Written Opinion of the International Searching Authority, International Application No. PCT/GB2022/050465, dated May 30, 2022, 4 pages.

* cited by examiner

PHASE A

L1

| Knuckle End | 1T → | 7B | ← | 13T → | 19B | → | 2T → | ← | 8B → | 14T → | ← | 20B → | 1B → | ← | 19T → | 13B → | ← | 7T → | 2B → | ← | 20T → | 14B → | 8T → |
|---|---|---|---|---|---|---|---|---|---|---|---|---|---|---|---|---|---|---|---|---|---|---|---|
| Connection End | 1T | 7B → | | 13T | 19B → | | 2T | | 8B → | 14T | | 20B → | 1B | | 19T → | 13B | | 7T → | 2B | | 20T → | 14B | 8T |

↑ Phase A Start                                                                                          → To Layer 2

L2

| Knuckle End | 1T → | 7B | ← | 13T → | 19B | → | 2T → | ← | 8B → | 14T → | ← | 20B → | 1B → | ← | 19T → | 13B → | ← | 7T → | 2B → | ← | 20T → | 14B → | 8T → |
|---|---|---|---|---|---|---|---|---|---|---|---|---|---|---|---|---|---|---|---|---|---|---|---|
| Connection End | 1T | 7B → | | 13T | 19B → | | 2T | | 8B → | 14T | | 20B → | 1B | | 19T → | 13B | | 7T → | 2B | | 20T → | 14B | 8T |

↑ Connection from L1                                                                                     → To Layer 3

L3

| Knuckle End | 1T → | 7B | ← | 13T → | 19B | → | 2T → | ← | 8B → | 14T → | ← | 20B → | 1B → | ← | 19T → | 13B → | ← | 7T → | 2B → | ← | 20T → | 14B → | 8T → |
|---|---|---|---|---|---|---|---|---|---|---|---|---|---|---|---|---|---|---|---|---|---|---|---|
| Connection End | 1T | 7B → | | 13T | 19B → | | 2T | | 8B → | 14T | | 20B → | 1B | | 19T → | 13B | | 7T → | 2B | | 20T → | 14B | 8T |

↑ Connection from L2                                                                                     → Phase A Starpoint

FIG. 15

PHASE B

L1

| Knuckle End | 17T→ | 23B | 5T→ | 11B | 18T→ | 24B | 6T→ | 12B | 17B→ | 11T | 5B→ | 23T | 18B→ | 12T | 6B→ | 24T |
|---|---|---|---|---|---|---|---|---|---|---|---|---|---|---|---|---|
| | ← | → | ← | → | ← | → | ← | → | ← | → | ← | → | ← | → | ← | → |
| Connection End | 17T | 23B→ | 5T | 11B→ | 18T | 24B→ | 6T | 12B→ | 17B | 11T→ | 5B | 23T→ | 18B | 12T→ | 6B | 24T |

← Phase B Start    To Layer 2 →

L2

| Knuckle End | 17T→ | 23B | 5T→ | 11B | 18T→ | 24B | 6T→ | 2B | 17B→ | 11T | 5B→ | 23T | 18B→ | 12T | 6B→ | 24T |
|---|---|---|---|---|---|---|---|---|---|---|---|---|---|---|---|---|
| | ← | → | ← | → | ← | → | ← | → | ← | → | ← | → | ← | → | ← | → |
| Connection End | 17T | 23B→ | 5T | 11B→ | 18T | 24B→ | 6T | 2B→ | 17B | 11T→ | 5B | 23T→ | 18B | 12T→ | 6B | 24T |

← Connection from L2    To Layer 3 →

L3

| Knuckle End | 17T→ | 23B | 5T→ | 11B | 18T→ | 24B | 6T→ | 2B | 17B→ | 11T | 5B→ | 23T | 18B→ | 12T | 6B→ | 24T |
|---|---|---|---|---|---|---|---|---|---|---|---|---|---|---|---|---|
| | ← | → | ← | → | ← | → | ← | → | ← | → | ← | → | ← | → | ← | → |
| Connection End | 17T | 23B→ | 5T | 11B→ | 18T | 24B→ | 6T | 2B→ | 17B | 11T→ | 5B | 23T→ | 18B | 12T→ | 6B | 24T |

← Connection from L2    Phase B Starpoint →

FIG. 16

PHASE C

L1

| Knuckle End | 9T→ | 15B | 21T→ | 3B | 10T→ | 16B | 22T→ | 4B | 9B→ | 3T | 21B→ | 15T | 10B→ | 4T | 22B→ | 16T |
|---|---|---|---|---|---|---|---|---|---|---|---|---|---|---|---|---|
|  | ← | → | ← | → | ← | → | ← | → | ← | → | ← | → | ← | → | ← | → |
| Connection End | 9T | 15B→ | 21T | 3B→ | 10T | 16B→ | 22T | 4B→ | 9B | 3T→ | 21B | 15T→ | 10B | 4T→ | 22B | 16T |

← Phase C Start      → To Layer 2

L2

| Knuckle End | 9T→ | 15B | 21T→ | 3B | 10T→ | 16B | 22T→ | 4B | 9B→ | 3T | 21B→ | 15T | 10B→ | 4T | 22B→ | 16T |
|---|---|---|---|---|---|---|---|---|---|---|---|---|---|---|---|---|
|  | ← | → | ← | → | ← | → | ← | → | ← | → | ← | → | ← | → | ← | → |
| Connection End | 9T | 15B→ | 21T | 3B→ | 10T | 16B→ | 22T | 4B→ | 9B | 3T→ | 21B | 15T→ | 10B | 4T→ | 22B | 16T |

← Connection from L1      → To Layer 3

L3

| Knuckle End | 9T→ | 15B | 21T→ | 3B | 10T→ | 16B | 22T→ | 4B | 9B→ | 3T | 21B→ | 15T | 10B→ | 4T | 22B→ | 16T |
|---|---|---|---|---|---|---|---|---|---|---|---|---|---|---|---|---|
|  | ← | → | ← | → | ← | → | ← | → | ← | → | ← | → | ← | → | ← | → |
| Connection End | 9T | 15B→ | 21T | 3B→ | 10T | 16B→ | 22T | 4B→ | 9B | 3T→ | 21B | 15T→ | 10B | 4T→ | 22B | 16T |

← Connection from L2      → Phase C Starpoint

FIG. 17

PHASE A

FIG. 18

FORM WOUND MOTOR FOR ELECTRICAL SUBMERSIBLE PUMPS

CROSS REFERENCE TO RELATED APPLICATIONS

This application claims priority to United Kingdom Patent Application No. GB 2104354.2 filed Mar. 26, 2021 entitled, "Form Wound Motor for Electrical Submersible Pumps," which is incorporated by reference herein in its entirety.

This invention relates to a Stator, in particular, conductors' installation and forming using a novel method of manufacturing of stators of long electric motors such as those used in oil and gas wells, replacing the conventional sew through methods. The new method improves power density, lowers the winding temperature, and reduces potential damage to conductors during the manufacturing process.

BACKGROUND OF THE INVENTION

Electric Submersible Pump (ESP) systems provide an efficient and reliable artificial-lift method for pumping a variety of production fluids from wellbores. With reference to FIG. 1, an ESP system 1 typically comprises a multi-stage centrifugal pump 30, a protector (also referred to as "seal-section") 20, a motor 10, and a gauge sensor 40 in an integrated unit.

The motor is a key part of an ESP system and comprises a Rotor and a Stator. The Rotor can either be induction or permanent magnet type. For large power motors of 1000 hp, the lengths can exceed 9 meters or 30 feet with a small Stator bore diameter of 100 mm or less. The Stator comprises a plurality of closed Stator slots (FIG. 3). Each stator slot having a plurality of copper conductors. The slots being closed, forces the winding manufacturers to typically use an insertion method of a continuous length of round conductors back and forth to achieve the required number of conductors inside each slot. This method is also known as a "sew-through" winding method. This back-and-forth insertion is a lengthy manufacturing process and introduces damage to the conductors by handling them multiple times through the slots. The conductors during the winding process are controlled by means of drums that assist in winding and unwinding of the round conductors multiple times increasing the risk of damage and work hardening of these conductors. The lengthy process and the risks to the integrity of the winding in long motors with closed slots can be eliminated by the use of form winding process by preferably but not necessarily using rectangular conductors.

Form-wound conductors present the potential for the Stator to be manufactured with short cycle times and at a consistent quality using semi-automated or fully automated processes. The conventional sew-through winding is replaced by pre-forming, inserting, final bending and joining operations. Thus, the complex, semi-precise, non-repeatable, and operator skill dependent winding process is replaced by a combination of better-controlled processes resulting in a precise winding where every conductor location is defined. In addition, the use of form-wound windings produced from conductors with rectangular cross-sections offers the potential to achieve product-related advantages, such as an improved copper fill ratio, compactness, better end-turn management, and ease of insulation.

SUMMARY OF THE INVENTION

According to the present invention, a new winding arrangement was developed to enhance the manufacturability of Stators with large length to diameter ratio and small aperture diameters such as the ones designed and manufactured for downhole pumping applications as shown in FIG. 1. The conductors are pre-formed to a specific shape, nested together, and inserted into the stator slots. The stator slots are closed, that is, once the laminations are assembled, each slot comprises a through bore through the stack of laminations, without the slot being open to the inner bore of the stator. Once the stator conductors are inserted, additional bending and joining operations are undertaken to complete the coils and phases. These operations can be either fully automated or semi-automated which is not possible for the conventional sew-through winding process. The joining of conductors can use a variety of methods including but not limited to brazing and laser welding or a combination.

The structure of the winding allows insertion of phase and phase to phase insulation after the joining operation is completed thus reducing the risk of damage to the insulation system during the joining process. The preformed conductors due to their ability to nest by geometry result in short end-turns compared to conventional windings. As a precision winding where every conductor position is known relative to each other, the insulation system can be applied precisely resulting in adequate segregation between conductors leading to high integrity. The winding structure is designed to accommodate a range of turns per coil to achieve the required rated current across the power range of the motors required for downhole pumping applications.

BRIEF DESCRIPTION OF THE DRAWINGS

FIG. 7(a) shows a pre-formed single-coil before insertion into the stator stack and FIG. 7(b) shows that coil after insertion and bending ready for joining to adjacent coils.

FIG. 15 is the joining and connections between conductors for Phase A of the winding illustrated in FIG. 13 and FIG. 14;

FIG. 16 is the joining and connections between conductors for Phase B of the winding illustrated in FIG. 13 and FIG. 14;

FIG. 17 is the joining and connections between conductors for Phase C of the winding illustrated in FIG. 13 and FIG. 14;

FIG. 18 is an alternate embodiment illustrating Phase A joining and connections of a stator where the start is on the opposite end;

DETAILED DESCRIPTION OF THE INVENTION

In the following description, numerous details are set forth to provide an understanding of the present invention. However, it will be understood by those of ordinary skill in the art that the present invention may be practiced without these details and that numerous variations or modifications from the described embodiments may be possible.

Figure 2:
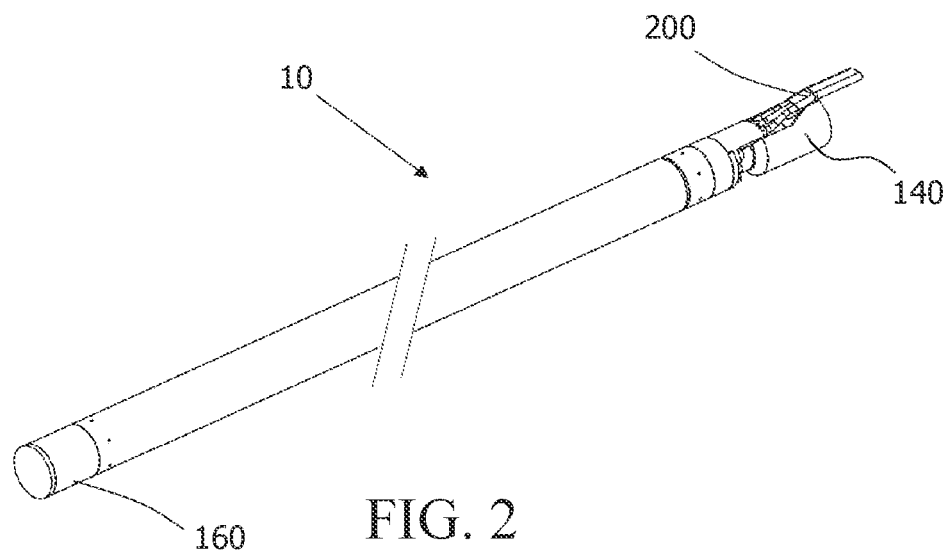
FIG. 2 is a typical motor part of an ESP assembly illustrated in FIG. 1.
Figure 3:
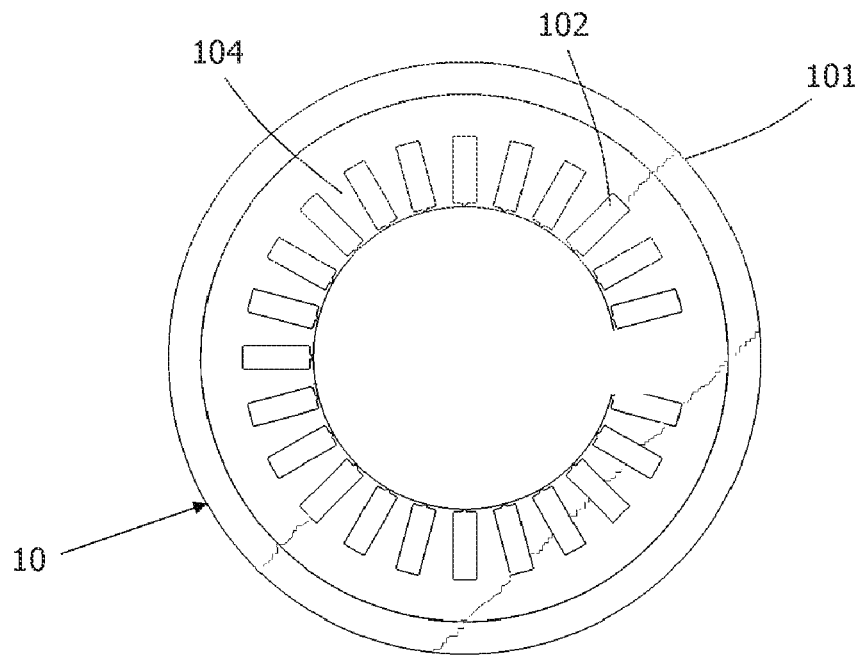
FIG. 3 is a cross-section through the motor showing the stator stack and laminations that will house the conductors of the motor illustrated in FIG. 2, the conductors are omitted for clarity.

In the present invention, the electric machine 10 shown in FIG. 2 has a multi-set of rectangular conductor windings formed thereon. The electric machine 10 may be supplied electrical power via a power cable 200. The electric machine 10 may be attached to the protector 20 by a motor head 140. The electric machine 10 comprises a Stator in a housing 101 having a plurality of stacked laminations 104 with fully closed slots 102 as shown in FIG.3. A plurality of conductors are positioned within the slots of the Stator and form a plurality of Winding Sets upon the Stator. For illustration, the stator stack in FIG. 3 is drawn with 24 slots and the winding structure is a balanced three-phase lap winding well understood by those skilled in the art.

Figure 4A:
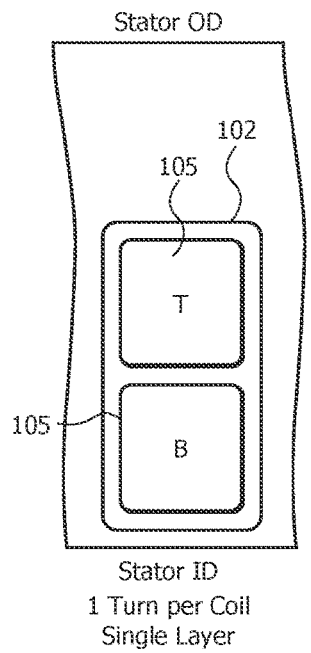
FIG. 4(a)-FIG. 4(c) illustrate the conductor layout inside a slot of a motor as illustrated in FIG. 2.

With reference to FIG. 4(a) illustrates the basic lap winding showing two conductors 105 in a slot. For the purpose of this invention, this is a one-layer winding. A slot may include two rectangular conductors corresponding to one turn per coil winding.

Figure 4B:
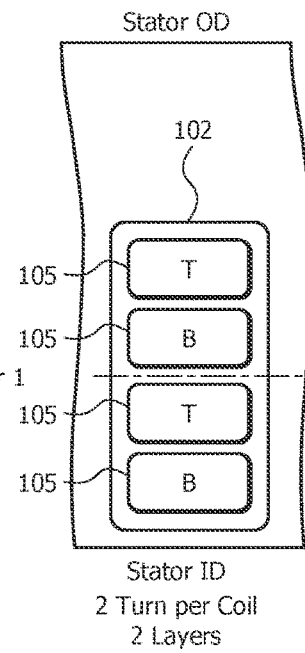

Referring to FIG. 4(b), this shows an alternative configuration, having two turns per coil winding. In this case, there are 4 conductors 105 in one slot. For the purpose of this invention, this winding is divided into two layers of two conductors each. In each layer, one conductor 105 is at the top and one conductor 105 is at the bottom. Again, this can be extended to windings of three turns per coil. Here, a slot with four rectangular conductors corresponding to two turns per coil. For the winding per an embodiment of this invention, the four conductor configuration is split into two layers of two conductors each. Each layer in this context is a Winding-set corresponding to an individual balanced three-phase lap winding.

Figure 4C:
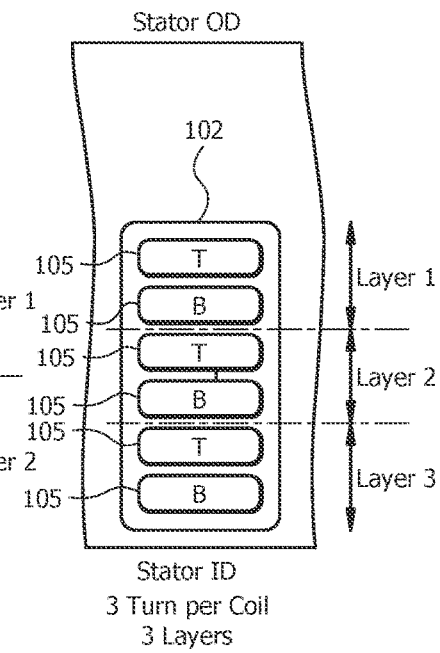

FIG. 4(c) extends the concept to three turns per coil configuration leading to a winding of three layers of two conductors 105 in each layer. This embodiment can be expanded to any arbitrary number of turns n leading to a winding of n-layer winding of two conductors 105 each. Each winding layer or Winding Set is comprised of a plurality of Conductor Segments, also referred to herein as Hairpins, positioned within the slots of the stator to form a balanced three-phase winding.

Each of the Winding Sets includes a Phase A winding, a Phase B winding, and a Phase C winding. The Winding Sets are each adjacent to each other upon the Stator, each Winding Set occupies one layer. Each layer is connected to the next layer either in series or parallel to form a complete motor winding. Each of the Winding Sets can be manufactured individually or concurrently with the other Winding Sets.

The layers are ideally arranged so each layer is stacked on top of the layer beneath, when a slot is considered as vertically aligned in cross section, i.e., they are layered in a radially outward direction. The layers may be assembled so that those which are radially outermost in the stator are inserted into the slots first, however the use of the conductors configured according to the invention allows their introduction in any order, all the conductor layers of a slot may be inserted simultaneously (and all the conductors of the stator may be inserted simultaneously). Typically, also, the top and bottom conductors of a single layer will be arranged on top of each other in a radially outward direction when considered in cross section.

Figure 5:
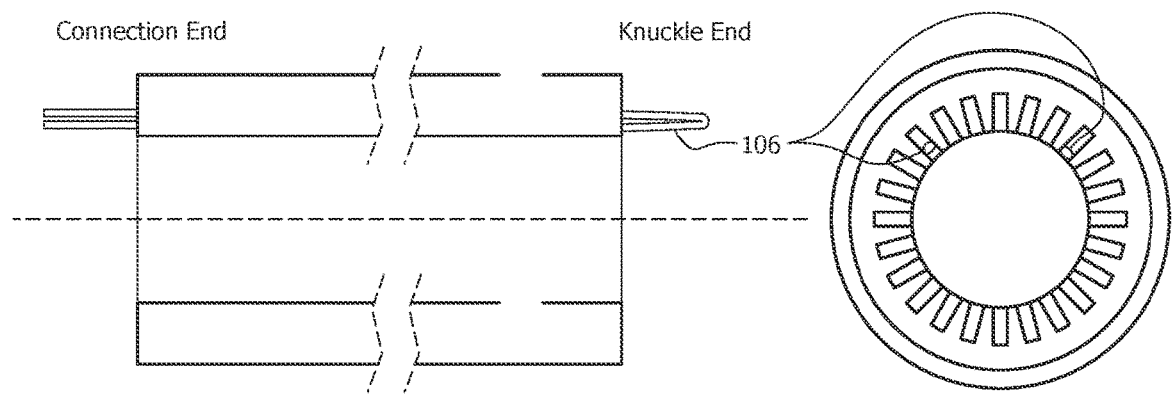
FIG. 5 is a side view of the stator showing the conductors exiting the slots as illustrated in FIG. 4(a). In this case, one end is joined after bending. One end identified as the knuckle-end and the other as the connection-end.
Figures 7A, 7B:
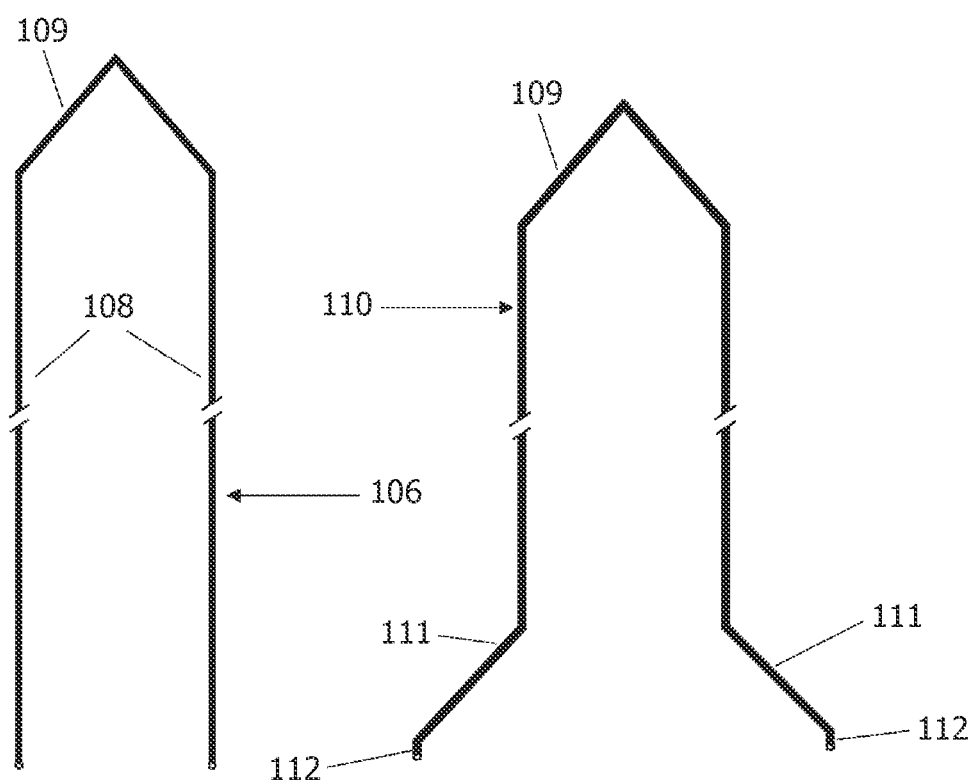
FIG. 7(a) and FIG. 7(b) are front views of the preformed conductor also known as hairpins before and after insertion and bending.

With reference to FIG. 5, each of the plurality of Hairpins 106 includes a "V" shaped end turn 109 and two legs 108 (FIG. 7(a)). The legs of the Hairpins are positioned in the slots of the Stator with each leg of the Hairpin in a different stator slot. Each Hairpin inserted into a Stator Slot is nested with respect to the adjacent hairpins. When a hairpin is fully inserted into the slots of the Stator, the V-shaped end turn 109 will extend from one end of the stator (Knuckle-End) and the legs, 108, will extend from the opposite end of the Stator (Connection-End). Any given Stator slot may include several Hairpin legs, and each Hairpin leg belongs to one layer within the Winding Set.

Once all the Hairpins are inserted in the Stator slots, a bending process is undertaken to bend the legs extending in the Connection-End of to a physical location in such a way to meet another Hairpin bent leg that forms a turn of a Phase. FIG. 7(b) is an illustration of the final shape of an individual Hairpin shown outside the Stator stack for clarity. A short straight section at the end of each bent leg 111, 112 will be for the joining operation, The bending tooling is designed with a stop to ensure all the short straight portions are aligned between layers for joining.

Figure 8:
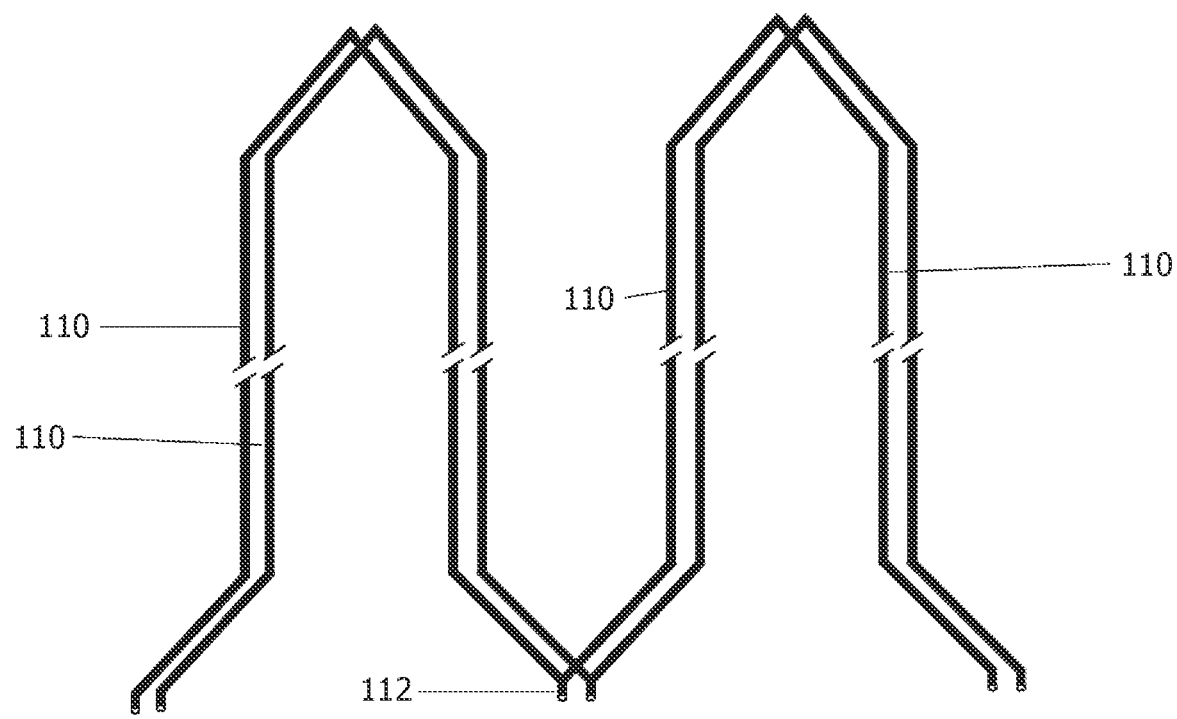
FIG. 8 is a front view of several preformed and bent coils or hairpins to illustrate the interconnection between the conductors that form the motor as illustrated in FIG. 2.

FIG. 8 shows an illustration of a partial multiset of Hairpins once they are in position and aligned ready for joining.

Figure 6:
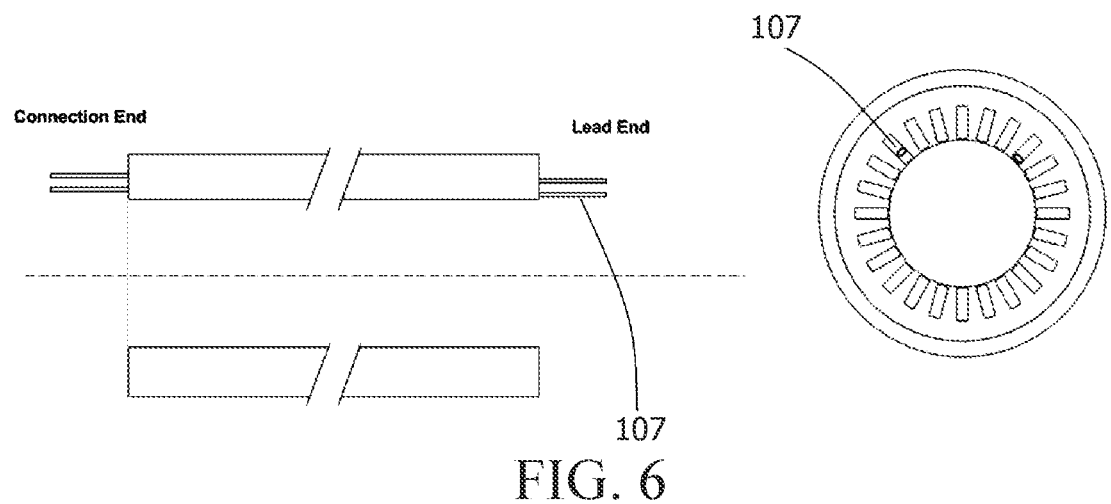
FIG. 6 is a side view of the stator showing the conductors exiting the slots as illustrated in FIG. 4(a). In this case both ends are joined after bending to form the coils.

FIG. 6, refers to cases where the stator lengths are longer than approximately 2 meters or 6 ft and it is no longer practical to form V-shaped hairpins within a reasonable manufacturing space. In this case, the conductors are cut in straight portions, 107 (FIG. 9(a) and FIG. 9(b)). When all the conductors are fully inserted into the Stator slots, the end turn will extend from one end of the stator (Lead-End) and the opposite end of the Stator (Connection-End). Any given Stator slot may include several Hairpin legs, and each Hairpin leg belongs to one layer within the Winding Set.

Figure 9A:
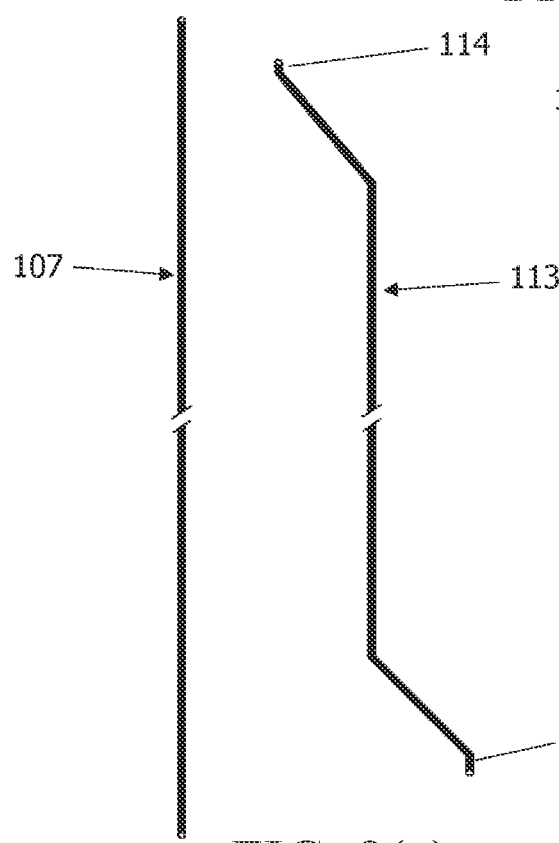
FIG. 9(a) and FIG. 9(b) are front views of two conductors before and after insertion in the slots and bending at both ends of the stator before joining at both ends, an additional embodiment of this invention.
Figure 9B:
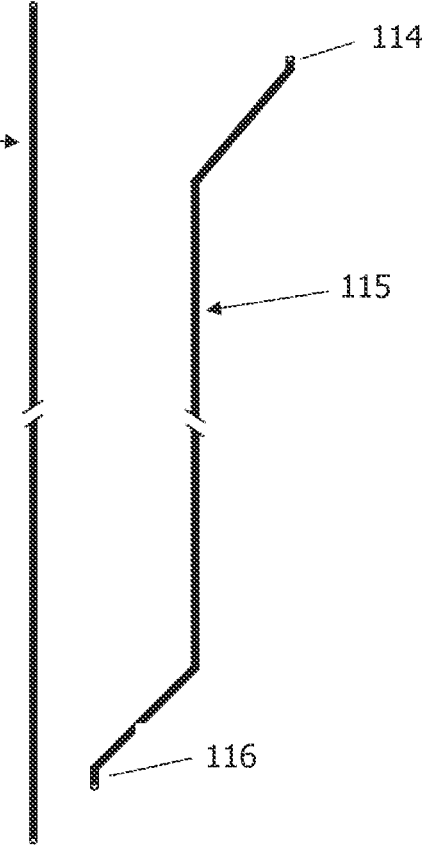

FIG. 9(a) and FIG. 9(b) show an illustration of the straight conductors 107 after bending at both end turns of the Stator. Here too straight portions (114 and 116) at the end of the bent legs will be joined to form coils and phase at both ends of the stator. On the Lead-End, all the conductors will be joined together after bending.

Figure 10:
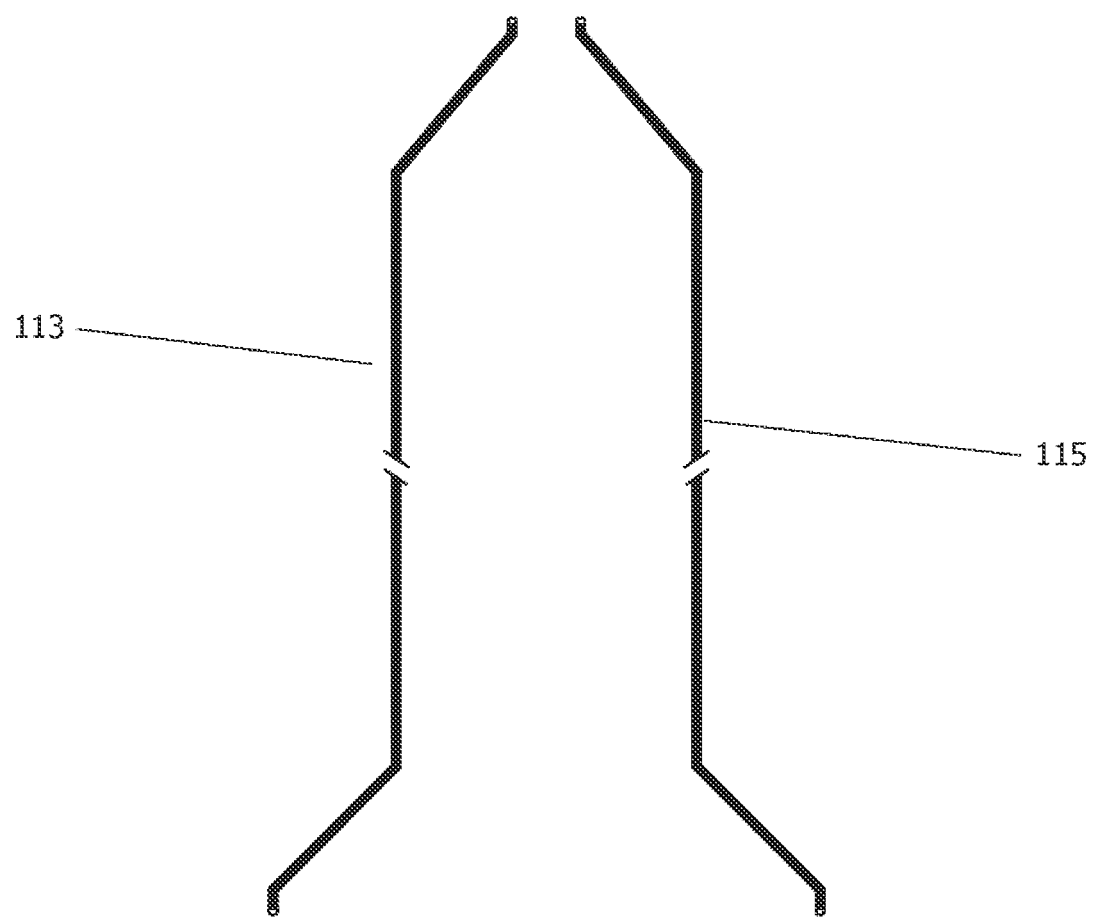
FIG. 10 shows the orientation of two bent straight conductors as illustrated in FIG. 9(a) and FIG. 9(b) prior to joining operation.

FIG. 10 shows two adjacent conductors 113 and 115 after bending operation and prior to joining. They are shown outside the Stator stack for clarity.

Figure 11:
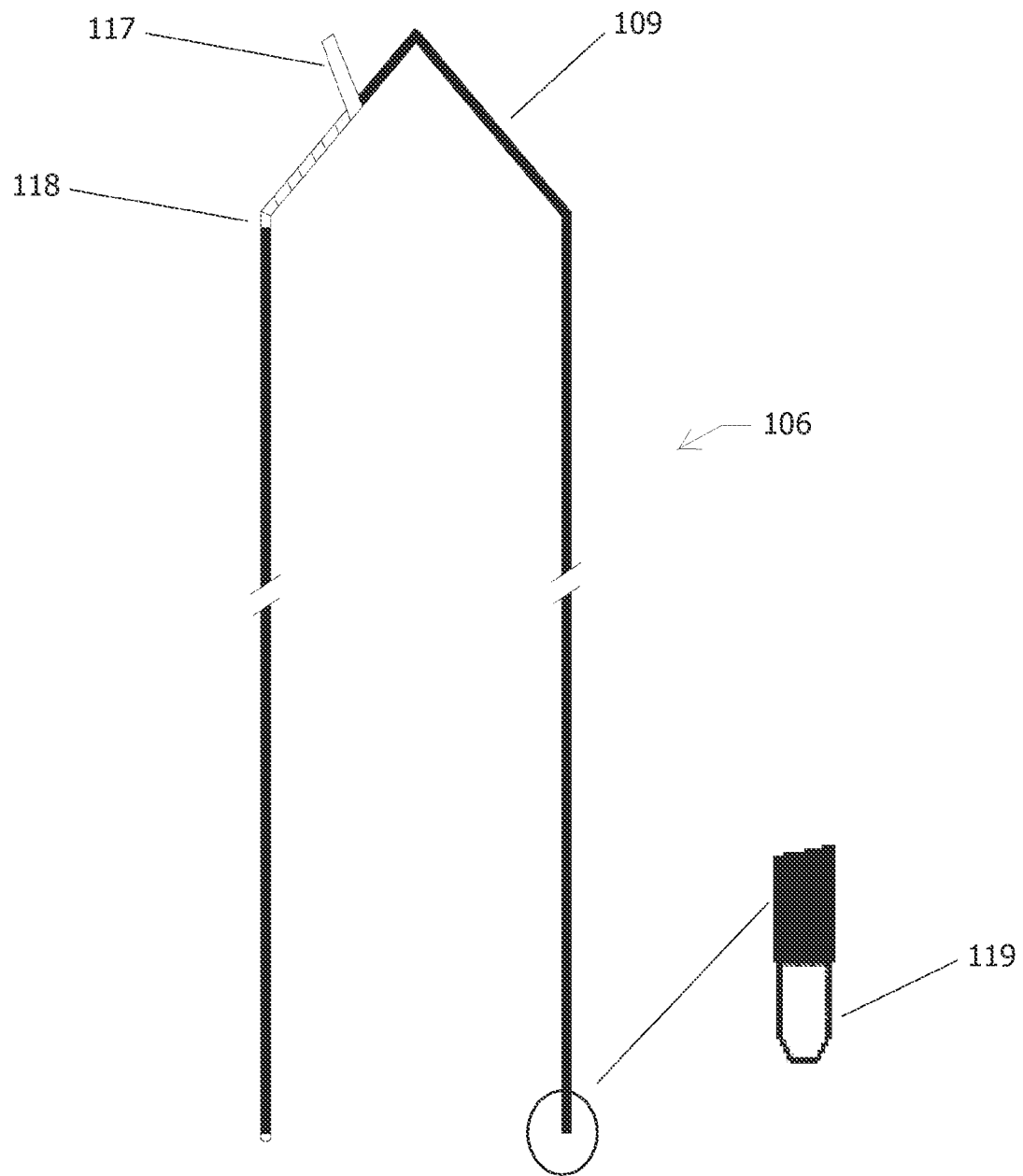
FIG. 11 shows the alternative method for insulation of the end extension and also an illustration of the end extension with enamel removed in readiness for bending and joining operation.

FIG. 11 shows an alternative method of insulation of the V-shaped end turns 106 prior to nesting the various Hairpins and installation in the stator. Tape 117 is used to wrap the V-shaped section 109 of the Hairpin from the beginning of the bend from both ends of the V-shaped section 109. A short section 118 on the straight leg 106 of the Hairpin is essential in strengthening the insulation of the conductors upon entry into the Stator stack. The Hairpins are typically made out of enamelled rectangular copper wire with the joining end 119 stripped from enamel insulation using mechanical abrasion or laser-based enamel removal methods. End 119 is part of the remaining straight portion of the conductor after bending, 112 or 116, that is used to join the adjacent conductor.

Figure 12:
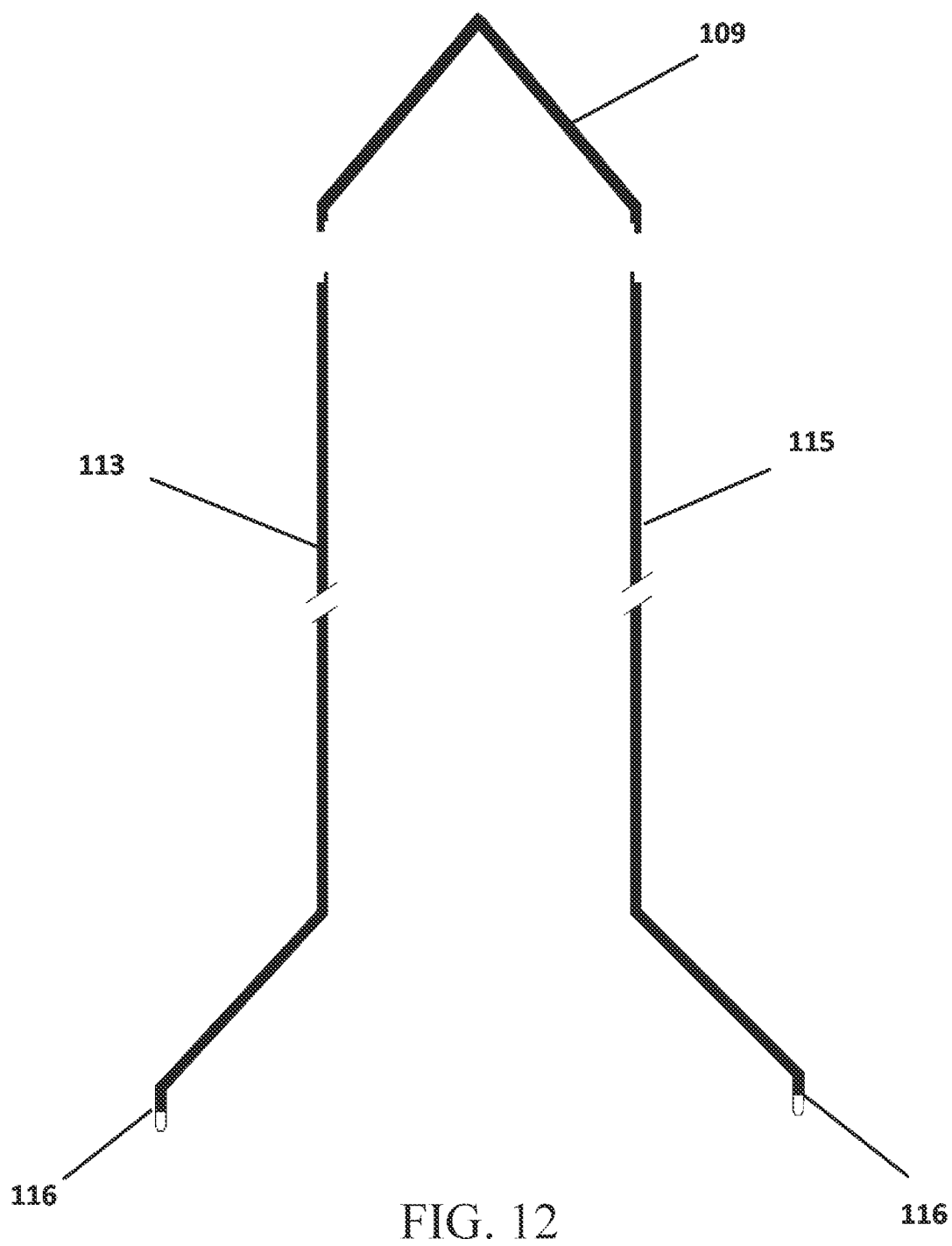
FIG. 12 Illustrates a different method of producing the Knuckle-End of the winding

FIG. 12 shows an alternate embodiment to the one described in FIG. 6. A Hairpin is formed by joining a V-shaped section 109 with two straight legs either prior to insertion or after insertion into the Stator stack. The ends of the V-shaped section 109 and the ends of the two straight legs 113, 115 to be joined may be shaped with complementary interlocking shapes, such as a rabbeted shape as shown, to aid positioning, connection, and joining V-shaped section and straight legs. Bending is then required only on the connection end. The joining is performed on both ends of the straight legs 113 and 115.

Figure 13:
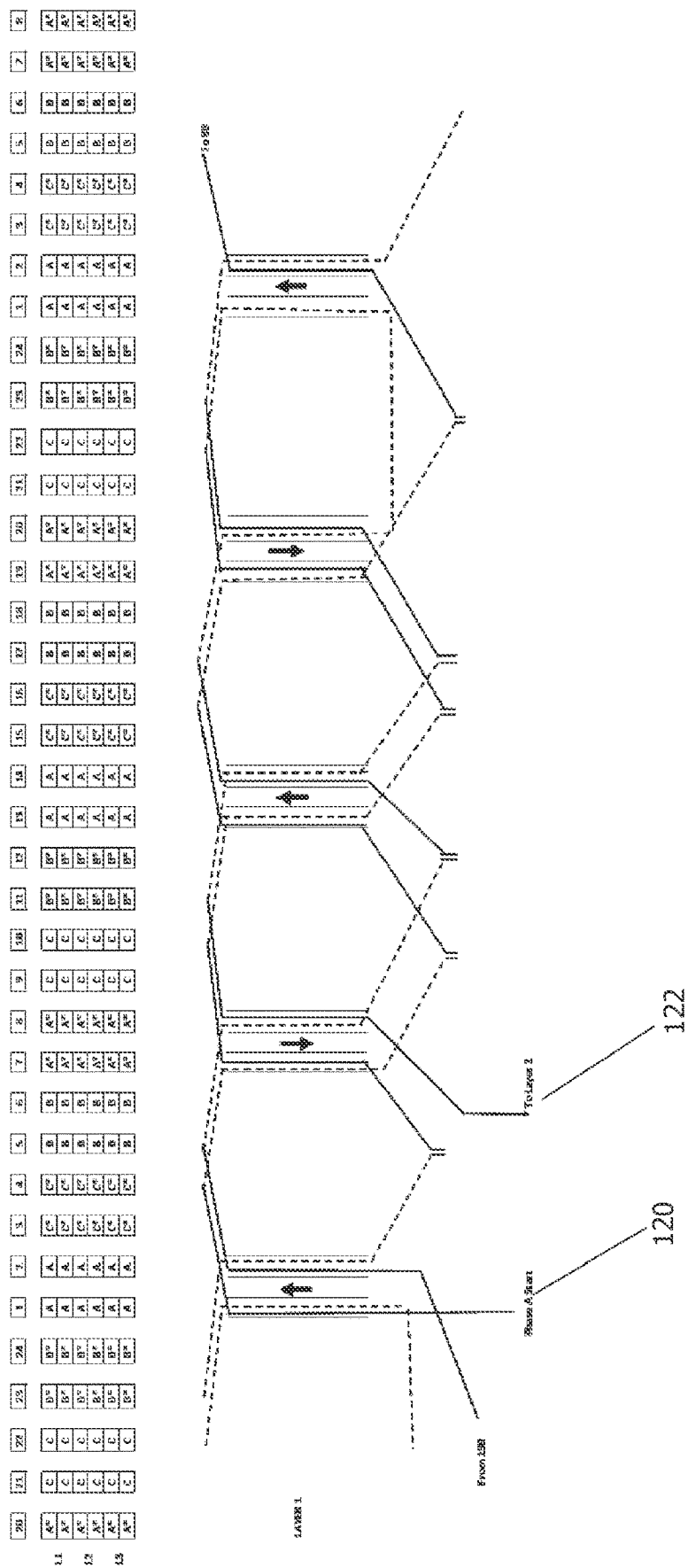
FIG. 13 shows the layout of one layer of a three-layer winding as illustrated in FIG. 4(c).

FIG. 13 shows a winding diagram for a 24 slot stator configuration with a 4 pole rotor configuration. All the details presented herein are applicable to other stator slot counts and rotor configurations. The winding configuration of FIG. 13 illustrates a lap full-pitch winding with 3 turns per coil resulting in three layers of two conductors each or three Winding Sets as shown in FIG. 4(c).

Figure 14:
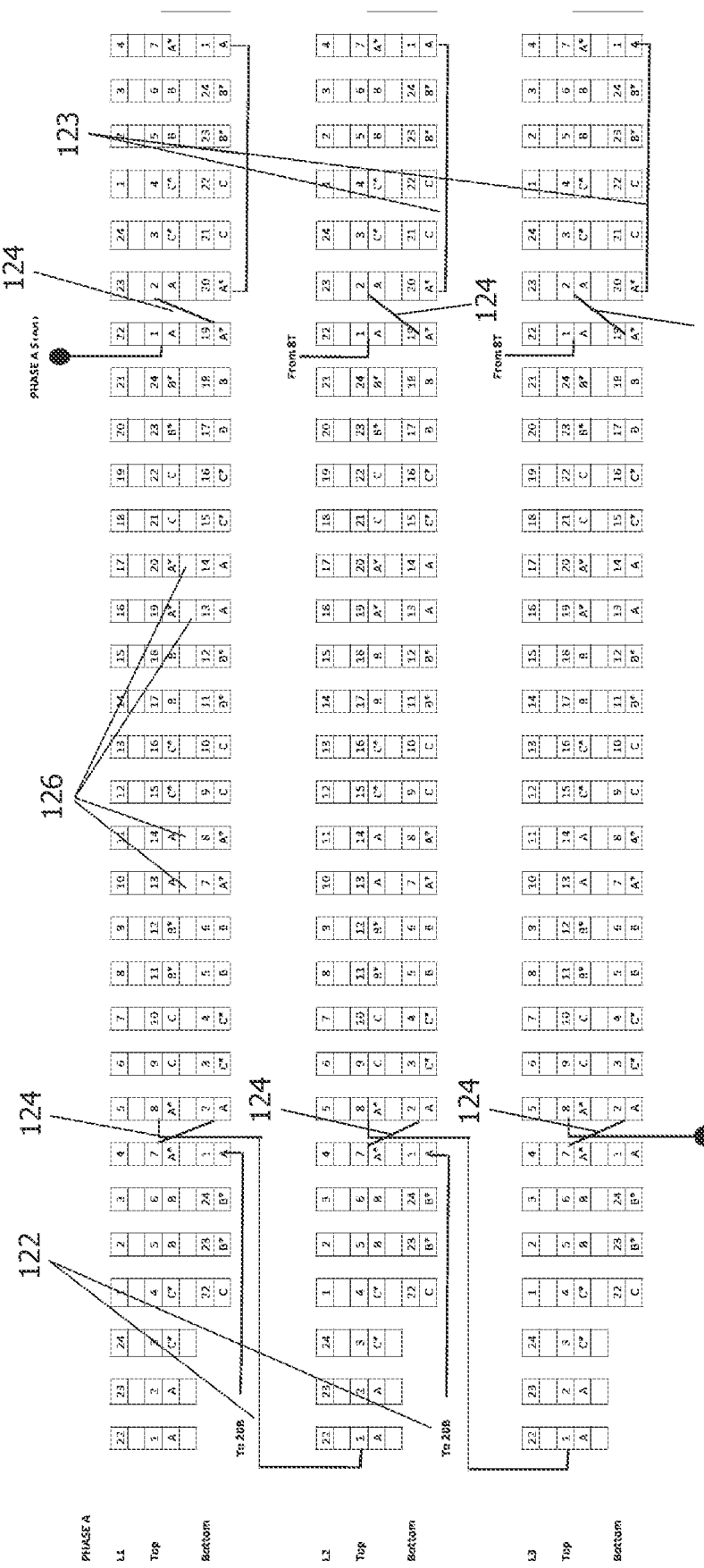
FIG. 14 illustrates the extension of the winding through the other layers to complete the winding illustrated in FIG. 13.

The winding diagram shows Phase A of Layer 1 only. For clarity, within a Winding set or Layer, all the Hairpins for all three phases A, B, and C are inserted, bent, and joined concurrently. Within the illustrated Layer (FIG. 13), the conductors are shown in solid lines if they are at the top (T) of the layer or dashed line if they are at the bottom (B) of the layer. Phase A starts at slot number 1 (120) and the end of Layer 1 of Phase A exits at slot number 8 (121). This exit end of Phase A of Layer 1 is connected to Slot number 1 of Layer 2. The Phase A of Layer 1 winding pattern is repeated on layer 2 and Layer 3. The End of Phase A exits Slot number 8 of Layer 3 and continues unbent to the Star-Point where all phases are connected to form the neutral of the motor. For the interconnections within a layer, short jumpers (124), and long jumpers (123) are required to complete the winding are illustrated in FIG. 14.

FIG. 15, FIG. 16, and FIG. 17 show the detailed connections for all three phases A, B, and C, respectively. For each phase, the diagram illustrates the connection joints, short jumper (124), long jumper (123), interlayer jumper (122). All the connection details can be developed for other allowable stator slot count and rotor pole count other than the ones described herein.

Figure 1:
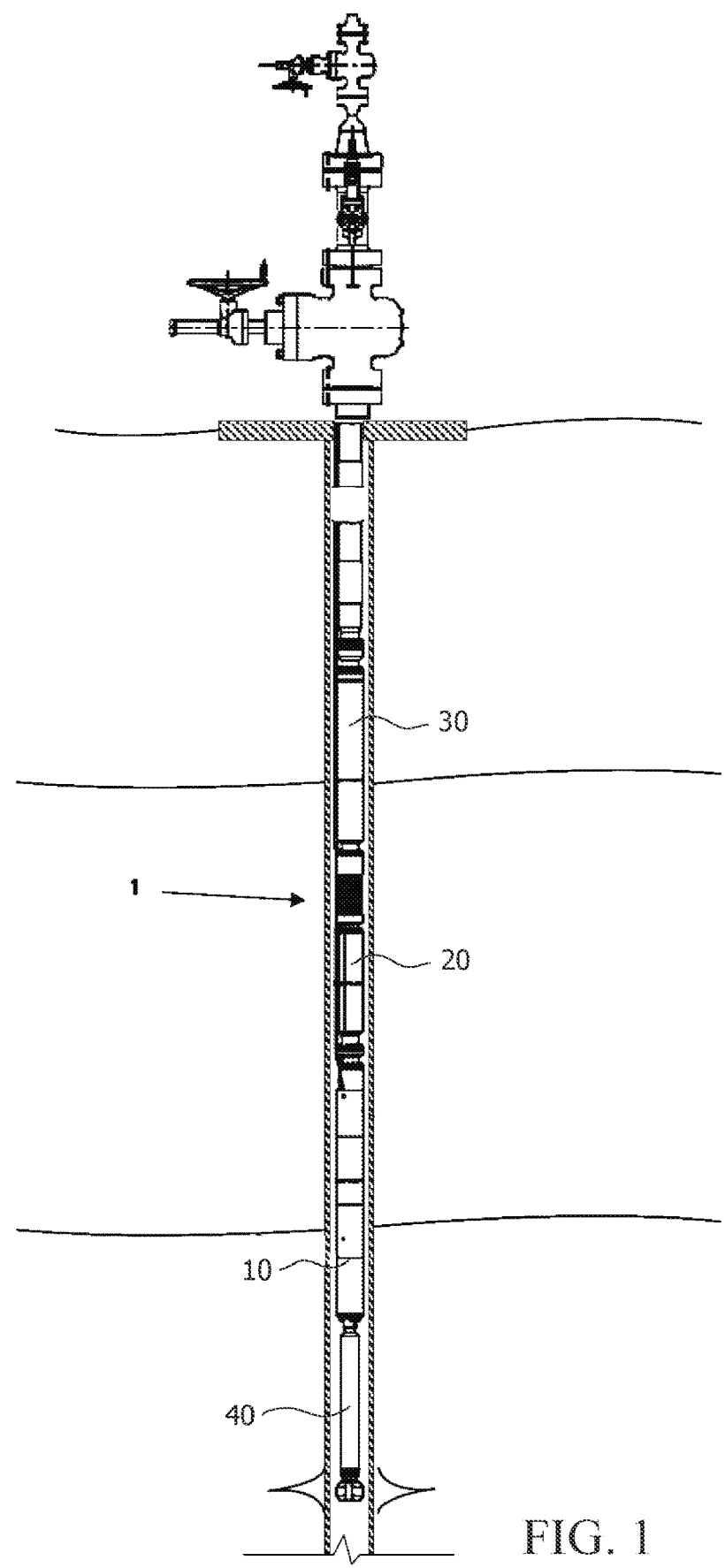
FIG. 1 is a front elevation view of an Electric Submersible Pumping (ESP) system in a wellbore, showing the motor, a key part of an ESP.
Figure 18:
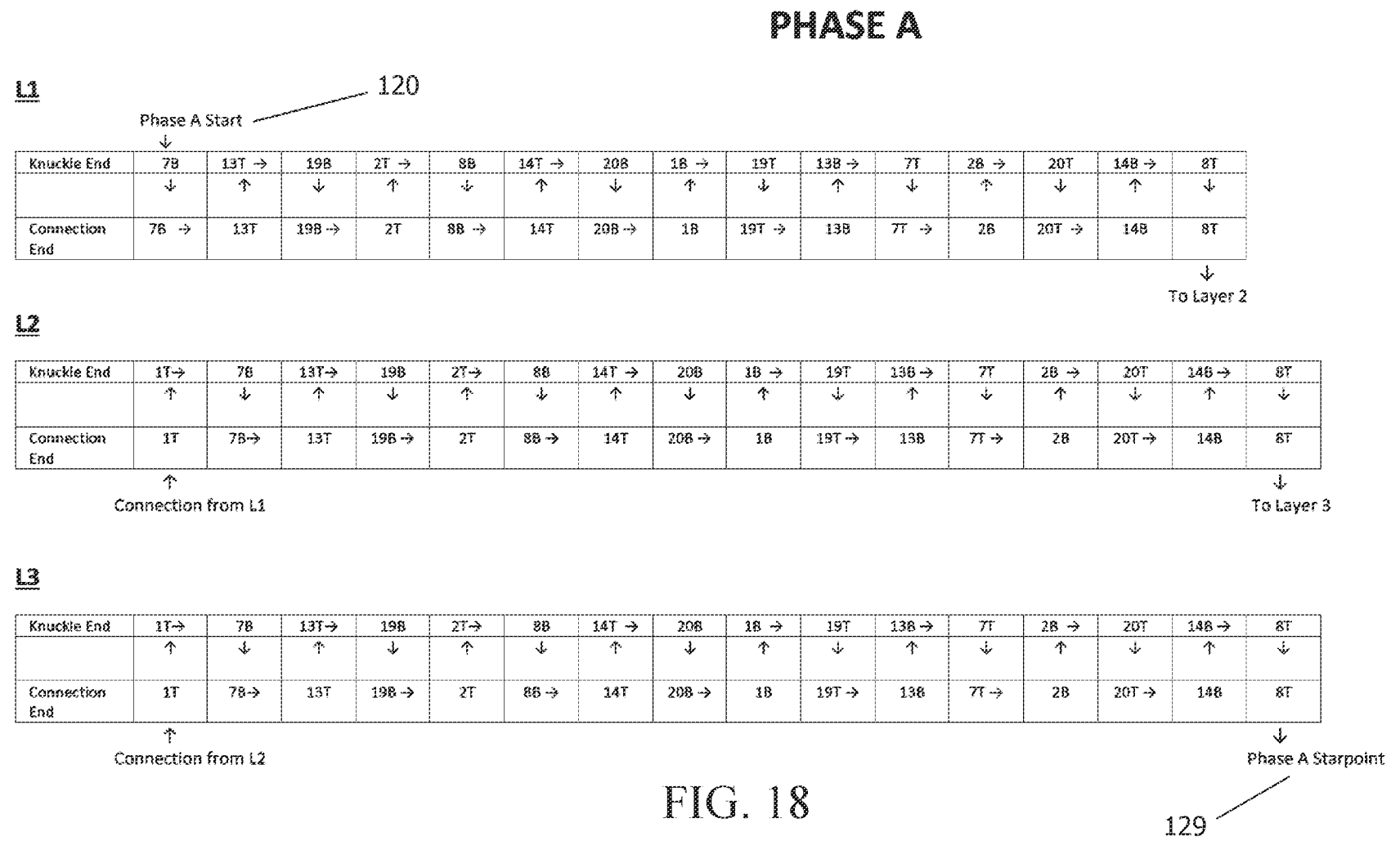

FIG. 18 is an alternate embodiment of this invention. The start of the phases is located at the V-shaped end of the stator. This embodiment has the advantage of allowing the lead end of the winding to be close to the power connectors of the motor and the Star-Point end to be close to the lower end of the motor connected to the gauge sensor 40 (FIG. 1). This alternate winding results in partially filled slots allowing the addition of temperature sensors or other means that benefit motor performance, monitoring, and operation.

Figure 19:
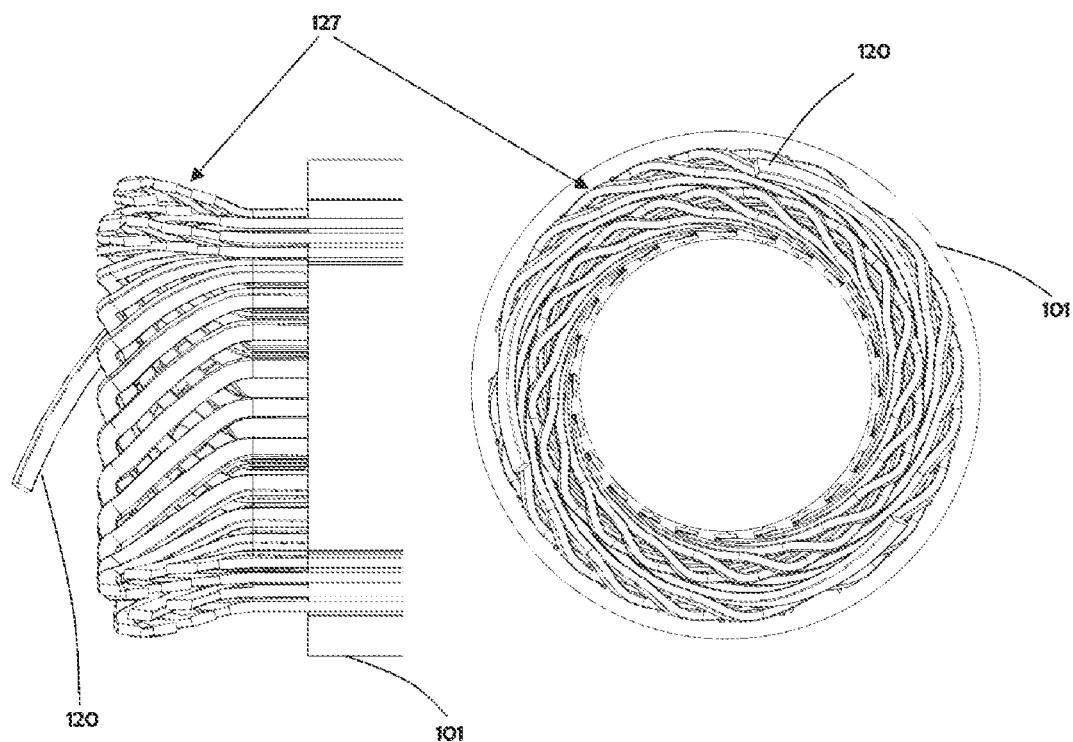
FIG. 19 is the front and side view of a 2 turns 2 layer winding as illustrated in FIG. 4(b)

FIG. 19 is the front and side view of the Knuckle-End (127) of 2 turns per coil or two-layer winding configuration (FIG. 4(b)) for illustration. It shows that the end turns are geometrically nested to reduce end turn extension length. It also illustrates the phase start leads (120) as shown in the alternate embodiment shown in FIG. 18.

Figure 20:
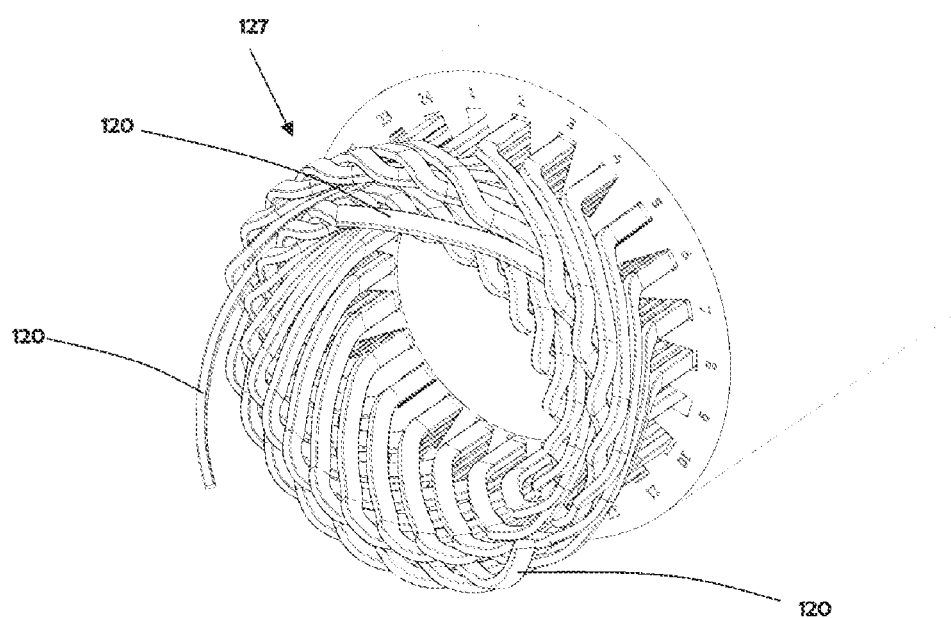
FIG. 20 is the isometric view of the Knuckle-End illustrated in FIG. 18.

FIG. 20 is a perspective view of the Knuckle-End (127) as shown in FIG. 19 clearly showing the conductor arrangements. The Phase A lead (120) is shown following the V-shaped end profile before exiting the end turn area. These three-phase leads are typically joined to a flexible insulated lead wire to connect to the power connectors and feedtroughs.

Figure 21:
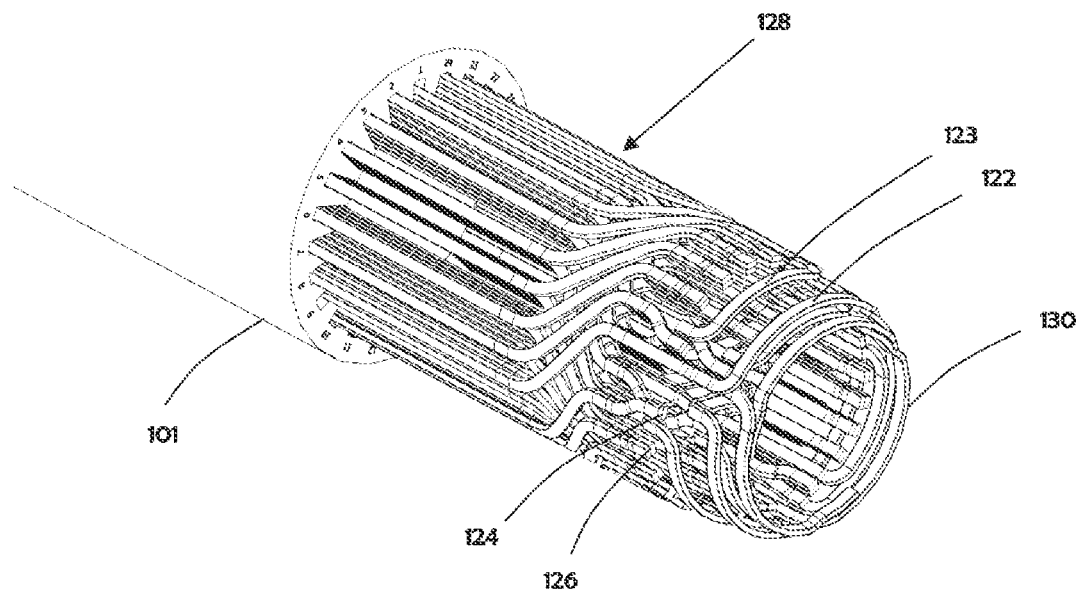
FIG. 21 is the isometric view of the Connection-End illustrated in FIG. 18.

FIG. 21 is the perspective view of the Connection-End of the winding (128). The connection end includes the short jumpers (124), the long jumpers (123), and the interlayer jumpers (122) for all three phases, and the Star-Point (130). The Connection-End (128) is longer than the Knuckle-End end (127) due to the connections at different layers as well as to accommodate the joining operation with the stator stack (100) inside the motor housing (101).

Figure 22:
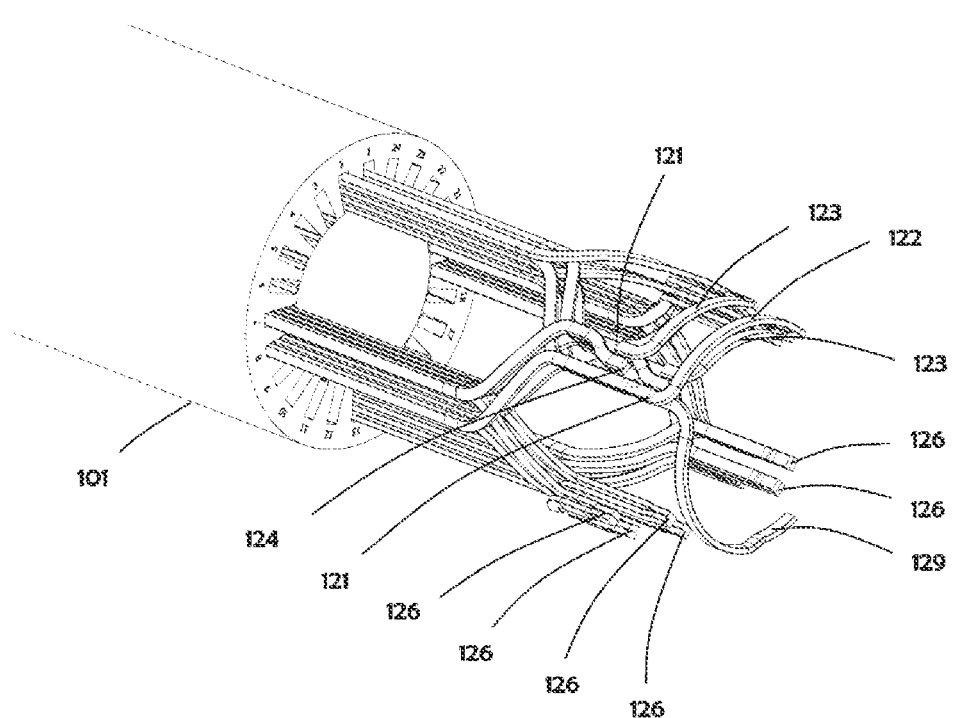
FIG. 22 shows the Connection-End details where only Phase A is illustrated for clarity.

FIG. 22 is a perspective view of Phase A of the Connection-End (128), showing the two long jumpers (123), the interlayer jumper (122), and the Phase A end lead (129). The soldered connections (126) of the straight legs (112) are also depicted in this view. The short jumper soldered connection (124) is located in between the soldered connection (121) of the long and interlayer jumpers (123, 122).

Figure 23:
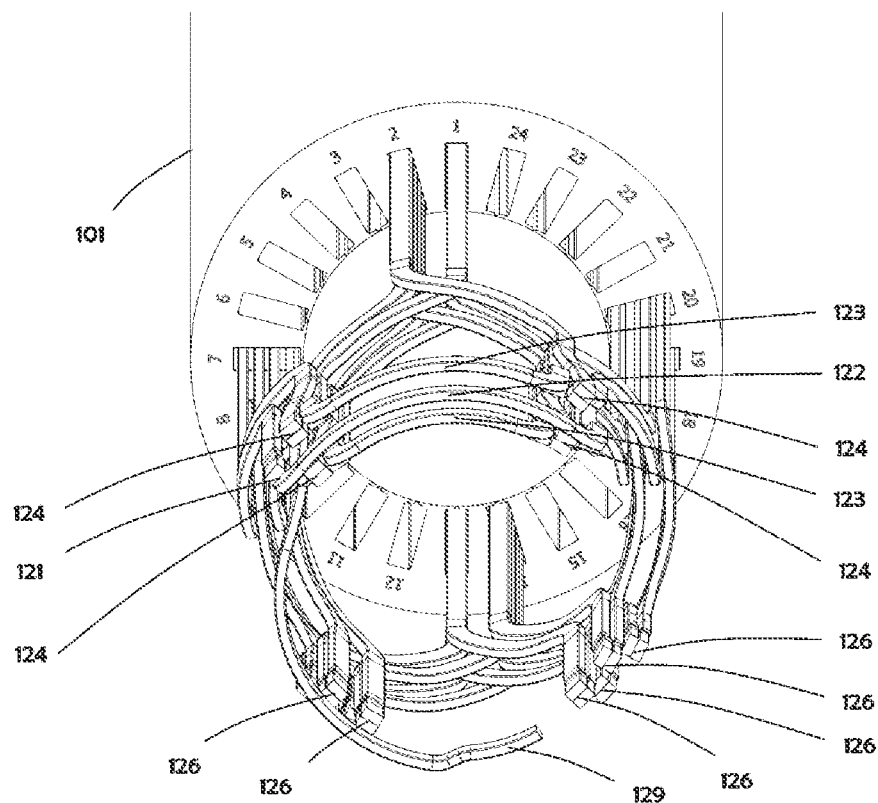
FIG. 23 is a further illustration of the Connection-End details for Phase A

FIG. 23 shows Phase A from a different perspective to provide a better view of the shape of the jumpers (122,123), the Phase A end lead, and the soldered connections (124) and (126).

Figure 24:
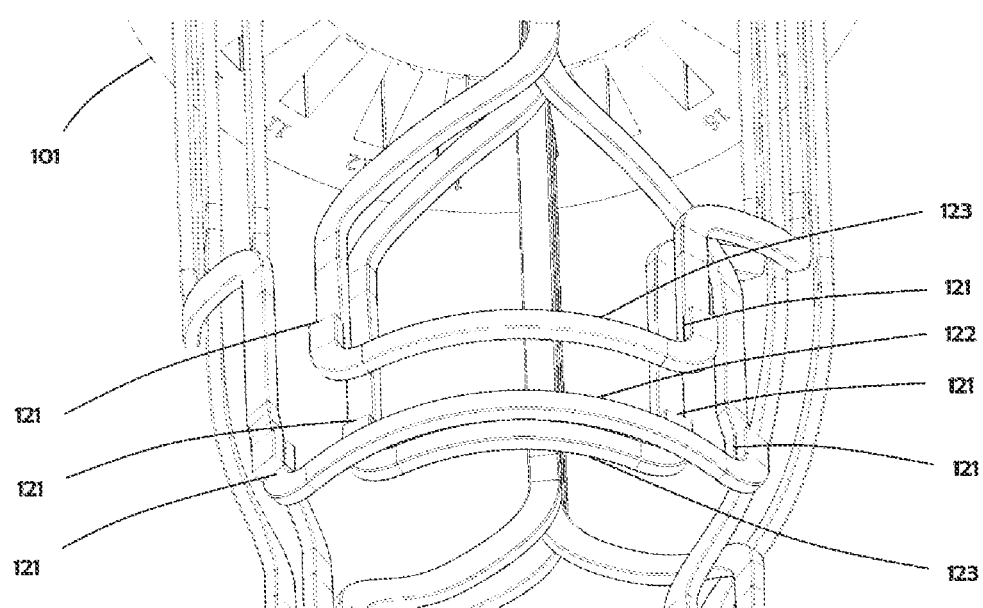
FIG. 24 shows the details of the long and interlayer jumpers as illustrated in the winding layout of FIG. 14

FIG. 24 illustrates the soldered connection (121) of the jumpers (122,123). The right angle formed ends of the jumpers (122,123) join the straight legs (112) of the corresponding Hairpins. The interlayer jumper (122) connects to the bottom side of the straight leg (112) of the top layer (left-hand side of view) and to the top side of the straight leg (112) of the bottom layer (right-hand side of view)

Figure 25:
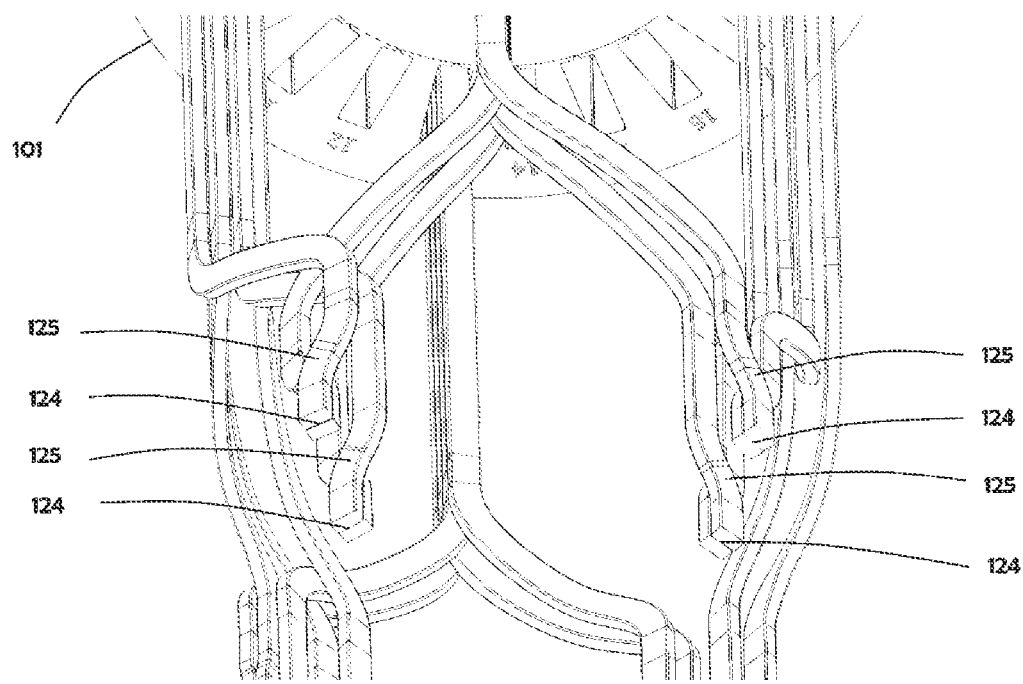
FIG. 25 shows the details of the short jumpers layout as illustrated in the winding layout of FIG. 14

FIG. 25 is a detail of the short jumper (124). The short jumper (124) is produced by further forming the straight leg (112) such that the adjacent bent legs (125) of the correct Hairpins line up under each other and form a turn in the corresponding phase.

Figure 26:
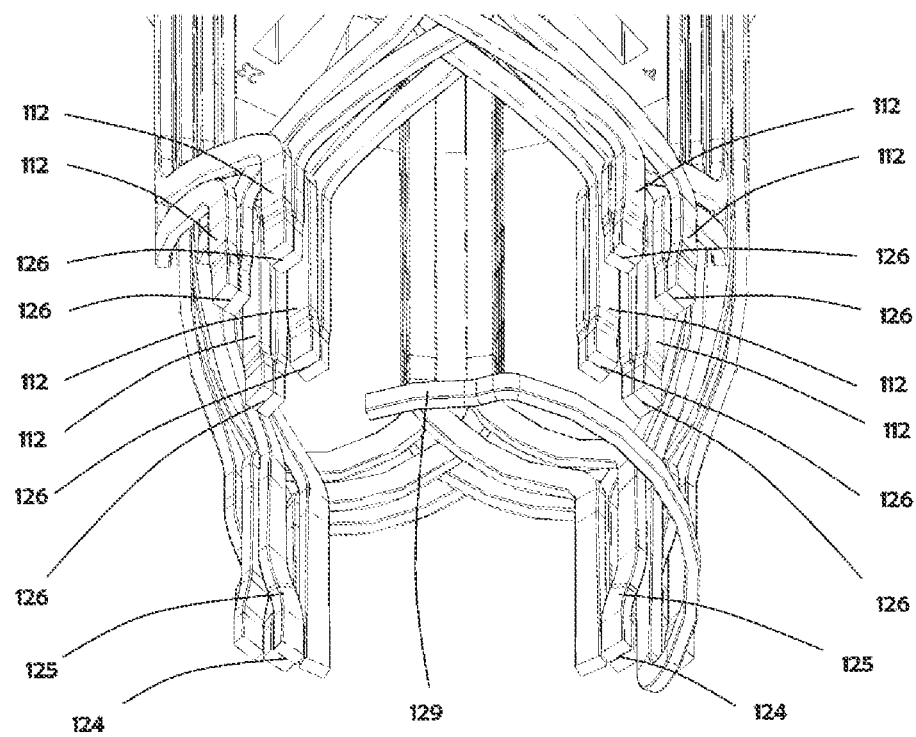
FIG. 26 is an elevated view of the Connection-End details for Phase A showing the straight connections complete with the Star-Point connecting conductor

FIG. 26 shows the soldered connection (126) of the straight legs (112). The inner side of a short jumper (124), as well as the formed leg (125) of the short jumper (124), can also be seen.

Figure 27:
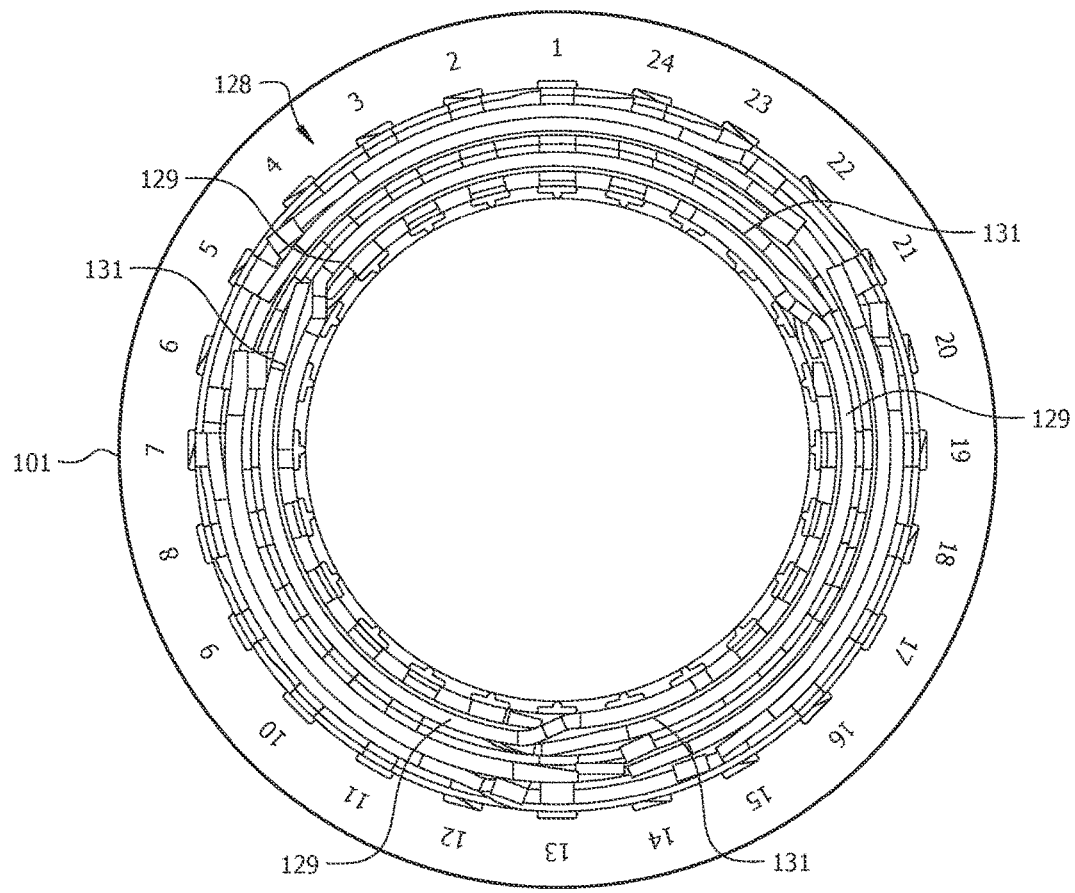
FIG. 27 is a front view of a complete Connection-End (all phases)

FIG. 27 is the front view of the Connection-End (128) of 2 turns per coil or two-layer winding configuration (FIG. 4(b)) for illustration. It shows that the end turns are geometrically nested to reduce end turn extension length. It also illustrates the phase end leads (129) overlapping each other and joined together by soldered connections (131) to form the Star-Point (130) of the winding.

Figure 28:
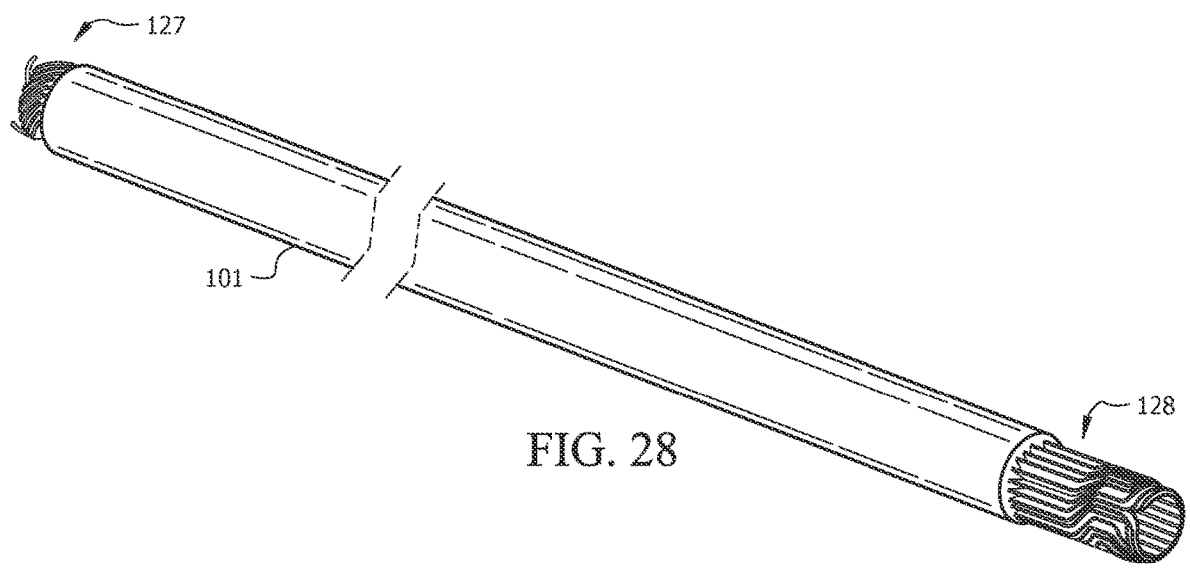
FIG. 28 a general view of the wound stator assembly showing both the Knuckle-End and the Connection-End.

FIG. 28 shows a perspective view of the stator stack (Housing 101 was omitted for clarity) with the Knuckle-End (127) and Connection-End (128) shown.

It should be understood that the above-described embodiments of the present invention are merely examples for clearly illustrating the present invention, and are not intended to limit the embodiments of the present invention. Other variations and modifications will be apparent to persons skilled in the art in light of the above description. And are neither required nor exhaustive of all embodiments. Any modification, equivalent replacement, and improvement made within the spirit and principle of the present invention should be included in the protection scope of the claims of the present invention.

The invention claimed is:

1. An electric stator for an electric motor comprising:
a stator stack defining a plurality of closed slots;
a plurality of winding sets, each winding set comprising a plurality of conductors, each winding set having two conductors inserted into each of the closed slots, each conductor having a leg which joins to another conductor, each conductor having a substantially rectangular cross-section, each winding set being a three-phase full-pitch lap winding wherein the lap winding connects the end of one coil to the beginning of another coil, with each coil connected to the next coil, wherein a number of the plurality of winding sets is equal to a number of turns per coil of the stator;
each winding set comprised of a phase A sub-set, a phase B sub-set, and a phase C sub-set;
all phase sub-sets in a winding set occupy one layer.

2. The electric stator according to claim 1 wherein the conductors are a plurality of two-legged hairpins that are nested and each hairpin is inserted into two closed slots and bent into position.

3. The electric stator according to claim 1 wherein the conductors are straight conductors that are inserted in the closed slots and bent into position.

4. The electric stator according to claim 1 wherein each of the phase subsets in a winding set is interconnected with the adjacent phase subset in the adjacent winding set.

5. The electric stator according to claim 1 wherein the Phase a plurality of phase leads and a star-point are located on the same side.

6. The electric stator according to claim 1 wherein insulation is added to a V-shaped end joining at least some of the plurality of conductors employing insulation tape prior to insertion.

7. The electric stator according to claim 1 wherein for each phase subset, all conductors' legs in the first layer and the second layer are joined in a knuckle end turn.

8. The electric stator according to claim 1 wherein in each phase subset, the majority of conductors' legs in the first layer and the second layer are joined in a connection end turn.

9. the electric stator according to claim 1 wherein the conductors are joined with a V-shaped section as an alternative to bending and joining.

10. The electric stator of claim 1, wherein at least some of the plurality of conductors of each winding set are formed of two or more conductor segments, wherein each of the conductor segments of a conductor are joined with a rabbet joint.

11. The electric stator of claim 1, wherein the conductors are a plurality of two-legged hairpins that are nested and each hairpin is inserted into two closed slots and bent into position and wherein each of the phase subsets in a winding set is interconnected with the adjacent phase subset in the adjacent winding set.

12. The electric stator of claim 1, wherein the conductors are straight conductors that are inserted in the closed slots and bent into position and wherein each of the phase subsets in a winding set is interconnected with the adjacent phase subset in the adjacent winding set.

13. The electric stator of claim 1, wherein the conductors are a plurality of two-legged hairpins that are nested and each hairpin is inserted into two closed slots and bent into position and wherein a plurality of phase leads and a star-point are located on the same side.

14. The electric stator of claim 1, wherein the conductors are straight conductors that are inserted in the closed slots and bent into position and wherein a plurality of phase leads and a star-point are located on the same side.

15. The electric stator of claim 1, wherein each of the phase subsets in a winding set is interconnected with the adjacent phase subset in the adjacent winding set and wherein a plurality of phase leads and a star-point are located on the same side.

16. The electric stator of claim 1, wherein the conductors are a plurality of two-legged hairpins that are nested and each hairpin is inserted into two closed slots and bent into position, wherein each of the phase subsets in a winding set is interconnected with the adjacent phase subset in the adjacent winding set, and wherein a plurality of phase leads and a star-point are located on the same side.

17. The electric stator of claim 1, wherein the conductors are straight conductors that are inserted in the closed slots and bent into position, wherein each of the phase subsets in a winding set is interconnected with the adjacent phase subset in the adjacent winding set, and wherein a plurality of phase leads and a star-point are located on the same side.

18. The electric stator of claim 1, wherein the conductors are a plurality of two-legged hairpins that are nested and each hairpin is inserted into two closed slots and bent into position and wherein for each phase subset, all conductors' legs in the first layer and the second layer are joined in a knuckle end turn.

19. The electric stator of claim 1, wherein the conductors are straight conductors that are inserted in the closed slots and bent into position and wherein each of the phase subsets in a winding set is interconnected with the adjacent phase subset in the adjacent winding set and wherein for each phase subset, all conductors' legs in the first layer and the second layer are joined in a knuckle end turn.

20. The electric stator of claim 1, wherein a plurality of phase leads and a star-point are located on the same side and wherein at least some of the plurality of conductors of each winding set are formed of two or more conductor segments, wherein each of the conductor segments of a conductor are joined with a rabbet joint.

* * * * *